Dec. 10, 1963   C. M. KNOWLES   3,113,758
FULCRUM ATTACHMENT FOR BLADED IMPLEMENTS
Filed July 17, 1961   2 Sheets-Sheet 2

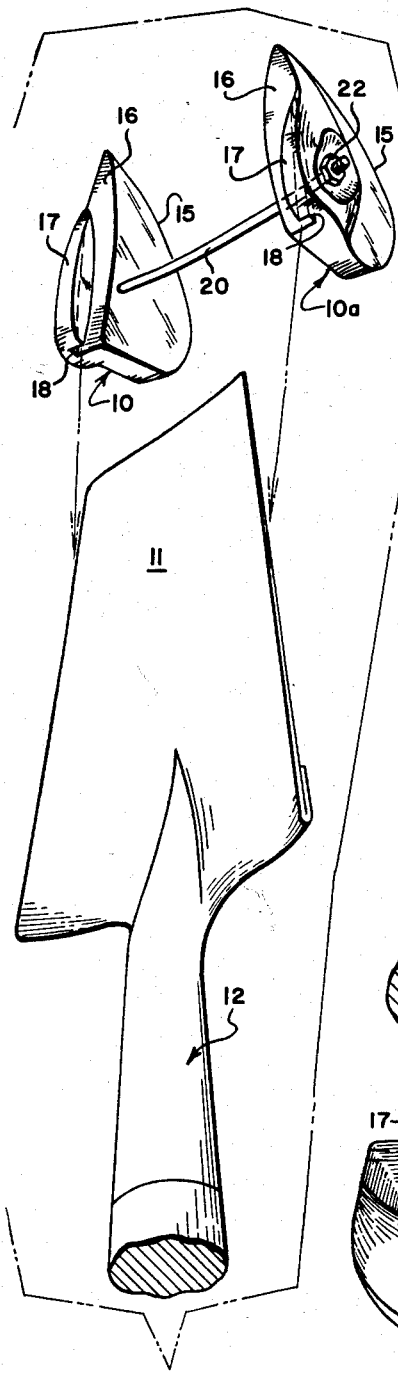
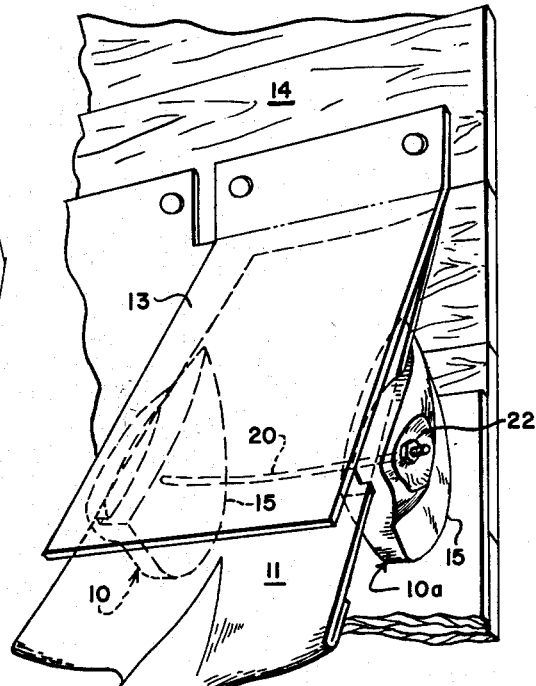
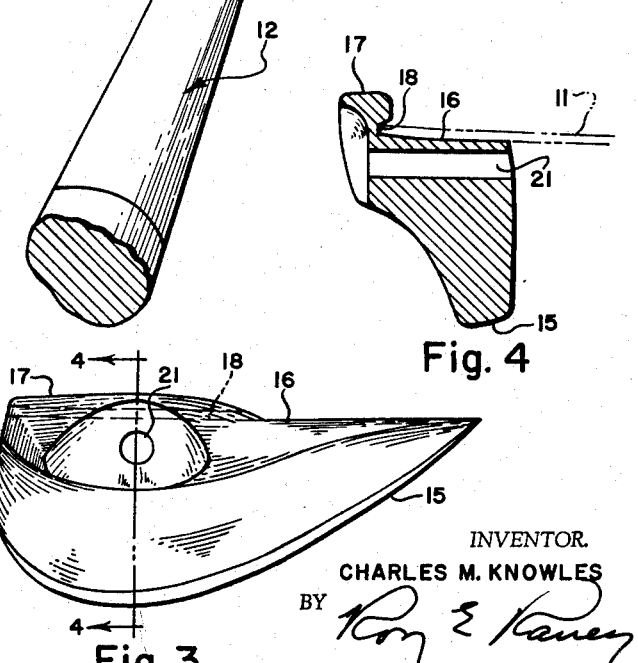
Fig. 1
Fig. 2
Fig. 3
Fig. 4

INVENTOR.
CHARLES M. KNOWLES
BY
ATTORNEY 3,113,758
FULCRUM ATTACHMENT FOR BLADED
IMPLEMENTS
Charles M. Knowles, 1200 36th Ave. N.,
St. Petersburg, Fla.
Filed July 17, 1961, Ser. No. 124,648
2 Claims. (Cl. 254—131.5)

The present invention relates to fulcrum or camming devices attachable to common bladed implements, such as shovels or harrow discs so that the blade of the implement can be utilized for prying and removing shingles from roofs.

The principal object of the present invention is the provision of a fulcrum device which can be removably attached to well known blade type implements, such as a spade or harrowing disc, so that the blade thereof can be inserted beneath a roof shingle and cammed or pivoted about the fulcrum device to pry the nailed edge of the shingle from the sheeting forming the roof.

In one form of the invention a fulcrum device is provided comprising two spaced members having curved cam-like fulcrum surfaces of like contour on one side thereof and ledge surfaces on the opposite side for receiving opposite edge portions of a blade type implement, such as a spade or shovel, and including means to secure the members to the blade in spaced relation.

The ledge surfaces of the fulcrum members preferably comprise a groove in each member for receiving opposite edge portions of a rectangular shaped bladed implement, and a tension member interconnects the two fulcrum members for drawing the members toward one another in securely clamped relation to the blade and with the curved surfaces projecting beyond one face of the blade.

Another form of fulcrum device embodying the invention is adapted to be secured on one side of a circular metal blade, such as a harrow disc, and to provide a pair of arcuate fulcrum members which are spaced to receive an operating handle, the fulcrum members being integrally connected and serving to provide pivot means when the blade is used for prying purposes.

Other objects and advantages of the invention will be apparent from the following description of preferred forms of the invention, reference being made to the accompanying drawings wherein:

FIG. 1 is a perspective view of a garden spade having one for of fulcrum members of the invention attached thereto and in position to pry a shingle from a roof;

FIG. 2 is a fragmentary perspective view of the spade and fulcrum members with the latter detached from the spade;

FIG. 3 is a side elevational view of a fulcrum member;

FIG. 4 is a sectional view taken on line 4—4 of FIG. 3;

Figure 6:
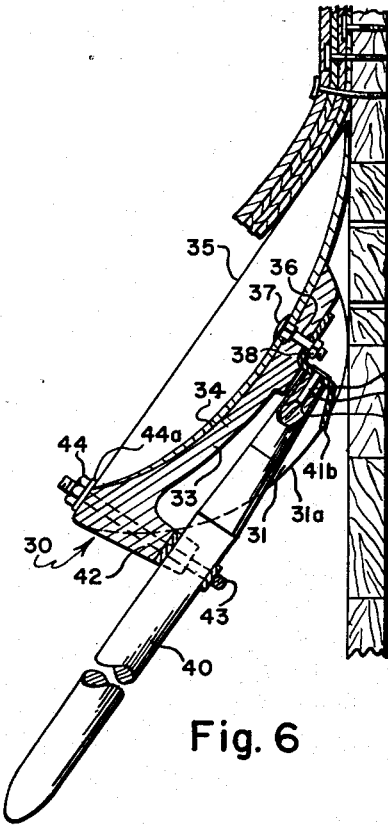
FIG. 6 is a sectional view taken substantially along the line 6—6 of FIG. 5 and showing the disc inserted beneath a shingle of a roof.
Figure 5:
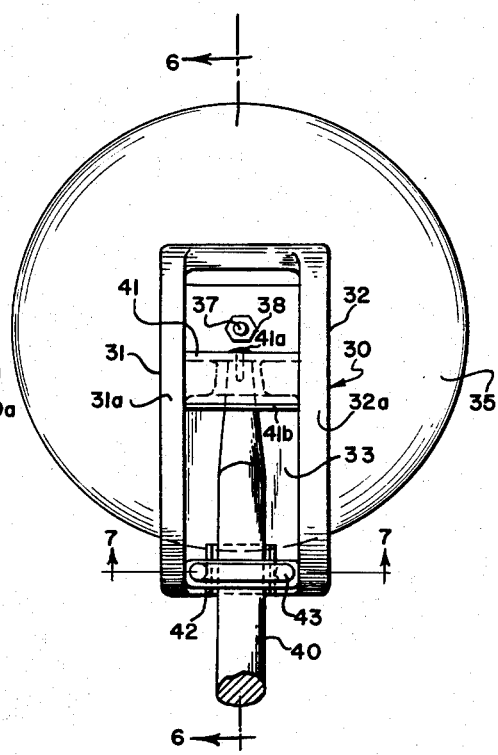
FIG. 5 is a plan view of another form of the invention shown attached to a circular harrowing disc.

Referring now to FIGS. 1 through 4, in one form of the invention a prying or fulcrum device is provided comprising a pair of fulcrum members 10 and 10a which may be detachably secured to the blade 11 of a common garden spade 12 so that the blade can be inserted beneath the free end of a roof shingle 13 and pivoted about the fulcrum members to pry the nailed upper end edge of the shingle from the sheeting 14 of a roof.

The fulcrum members are preferably formed of cast metal, such as aluminum or iron, and each has a curved or cam-like surface 15 on one side and a blade engaging planar surface 16 on the other side which is arranged to receive the edge portion of blade 12. Preferably a portion 17 of the member projects above and overhangs surface 16 to form a groove 18 therewith the receive the side edge portion of blade 12, in which position the curved surfaces 15 project beyond the plane of the blade.

Members 10 and 10a are secured to the edge portions of blade 12 by clamping means comprising a bolt 20 which projects through openings 21 formed through the fulcrum members. The bolt has a head formed at one end thereof (not shown) and the opposite end of the bolt is threaded to receive a nut 22 so that when the members are positioned on opposite sides of spade blade 12 with the edge portions of the blade received in grooves 18, as shown in FIG. 1, nut 22 is tightened on tie bolt 20 to tightly draw members 10 and 10a toward one another and thereby firmly clamp the members to opposite sides of the spade blade with the curved surfaces 15 facing outwardly from the bottom face thereof. The blade 12 may then be inserted beneath the unattached edge of the shingle, and the leading edge moved against the attached edge of the shingle and then by bearing down on the handle the blade may be pivoted on surfaces 15 of the fulcrum members to apply considerable upward force beneath the nailed edge of the shingle to easily pry it from the roof.

It will be seen that the fulcrum members form a pair of prying or wedging surfaces which can be economically manufactured and readily applied to the well known and common garden spade to provide an effective shingle removing instrument. It will also be seen that because the edges of the blade are received in grooves 18, the fulcrum members provide a stiffening function for the spade which is thereby enabled to endure far greater prying effort than could a spade not similarly equipped.

Referring to the form of invention shown in FIGS. 5 to 8, a fulcrum device 30 is shown comprising a unitary casting having two arcuate, spaced fulcrum members 31 and 32 extending from and integrally connected by an arcuate web 33. Web 33 has a concave surface 34 on the side opposite fulcrum members 31 and 32, and surface 34 is contoured to receive the convex portion of a well known type circular harrow blade 35 as shown in FIG. 6. To attach the device 30 to the blade 35 an opening 36 is provided through web 33 to receive a bolt 37 extending through the axle hole of the harrow blade, the bolt receiving a nut 38 to secure the device to the blade. Preferably, a handle 40 is attached to the central portion of the device 30 between fulcrum members 31, 32 thereof by an S-shaped bracket 41 having an opening through which bolt 37 extends and including a pin 41a received in a bore 40a formed in the end of the handle. The handle is cradled in a semi-cylindrical section of a strut 42 formed at one end of the device 30 and is secured therein by a U-bolt 43 extending through two openings 43a formed in the casting and drawn against the handle by nuts 44 threaded thereon. One or more arcuate shims 42a may be disposed between strut 42 and handle 40 prior to tightening of U-bolt 43, the shim or shims serving to provide angular adjustment between the handle and the fulcrum device to accommodate the preference of the individual using the device. The openings 43a through which the legs of the U-bolt extend are adjacent to the edge of surface 34 so that the nuts 44, and washers 44a thereunder, overlie the edge of the harrow blade and secure that edge to the fulcrum device 30, as seen in FIG. 6.

By this arrangement the harrow blade may be manipulated by the handle and inserted beneath the loose edge of a shingle and moved adjacent the attached edge of the shingle, as seen in FIG. 6, and the circular blade may then be pivoted about the curved fulcrum member surfaces 31a and 32a which engage the roof, so as to exert an upward prying action to the nailed edge of the shingle to remove it from the roof sheeting.

At times during the removal of shingles the nail heads pull through the shingles and are left sticking up from the roof sheeting. These nails must, of course, be removed and to this end the S-shaped bracket 41 presents an edge 41b below handle 40 and between arcuate fulcrum members 31, 32. By using a backward or raking motion the operator may use edge 41b to straighten and/or pull nails which remain after prying off the shingles.

Should an edge portion of the circular blade become dulled, bolt 37 and nuts 44 may be loosened and the blade rotated slightly to bring a fresh edge into position opposite the handle, after which the bolt 37 and nuts 44 are retightened.

As is well known, harrow discs or blades are readily available in many hardware or farm equipment outlets so that replacement of the blade is inexpensive and convenient.

Figure 8:
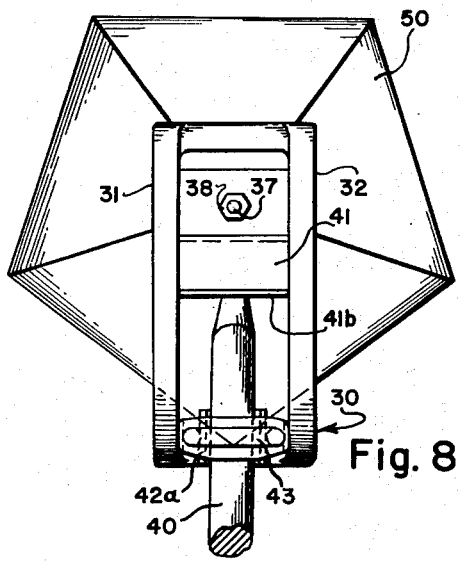
FIG. 8 is a view similar to FIG. 5 but showing a device embodying the second form of the invention attached to a pentagonal blade.
Figure 7:
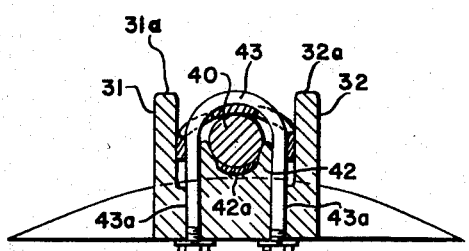
FIG. 7 is a sectional view taken substantially along line 7—7 of FIG. 6 and turned approximately 180°.

FIG. 8 shows a pentagonal shaped blade 50 to which fulcrum device 30 may be attached in the manner described with reference to the circular harrow blade 35.

Although I have described but two forms of my invention, it is to be understood that other forms, modifications and adaptations could be made, all falling within the scope of the claims which follow.

I claim:
1. A fulcrum device for use with a spade, said device comprising a pair of fulcrum members each having a blade engaging surface and a portion overlying said surface to define a groove therebetween for receiving one of the opposite side edges of a spade blade, said members each having a curved fulcrum surface adapted to project from one face of a blade to which the device is attached, and tie bolt means extending between said fulcrum members and adapted to draw said members into tight clamping engagement with a spade blade therebetween.

2. A device as defined in claim 1 and wherein said blade engaging surface and said curved fulcrum surface merge to form a point at one end of each of said fulcrum members.

References Cited in the file of this patent
UNITED STATES PATENTS

| | | |
|---|---|---|
| 1,232,361 | Mills | July 3, 1917 |
| 2,681,792 | Blue | June 22, 1954 |
| 2,769,236 | Phillips et al. | Nov. 6, 1956 |
| 2,894,720 | Bennett | July 14, 1959 |